July 28, 1942.  W. D. TIPTON  2,291,120
POWER TRANSMISSION
Filed Sept. 30, 1940
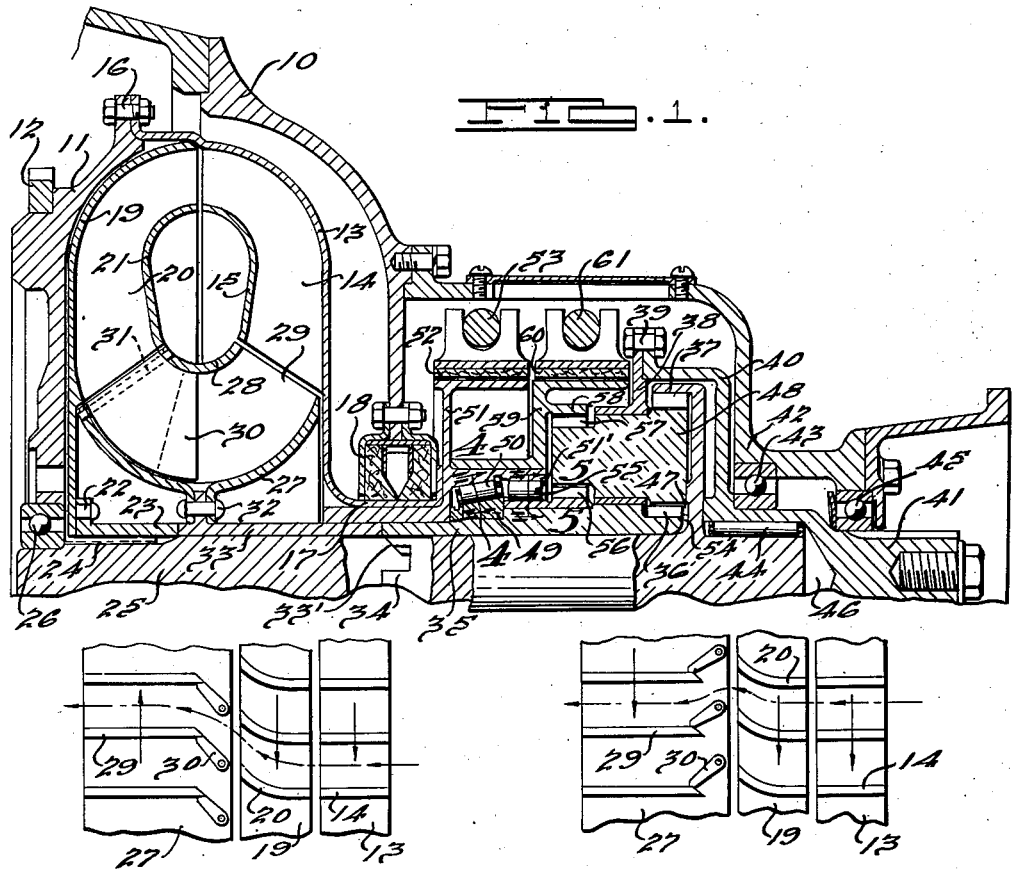
Fig. 1.
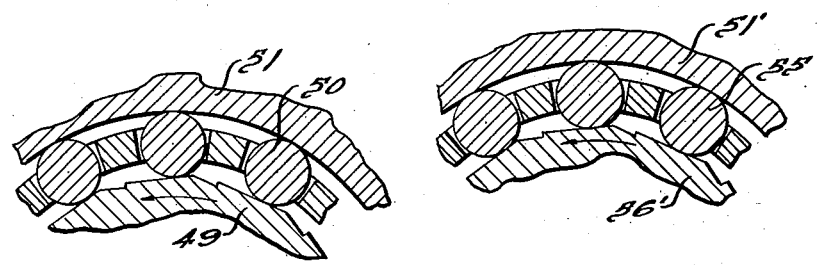
Fig. 2.   Fig. 3.
Fig. 4.   Fig. 5.
INVENTOR
William D. Tipton.
BY
ATTORNEYS.

Patented July 28, 1942

2,291,120

UNITED STATES PATENT OFFICE 2,291,120

POWER TRANSMISSION

William D. Tipton, Baltimore, Md.

Application September 30, 1940, Serial No. 359,013

19 Claims. (Cl. 74—189.5)

This invention relates to power transmissions of the type particularly adapted for use in automotive vehicles. It pertains particularly to hydrodynamic transmissions of the type wherein the hydraulic part of the transmission is adapted to function either as a torque converter or as a kinetic coupling.

The principal object of the invention is to provide a transmission of the aforesaid type which will automatically function to give two conversion ratios and direct drive as well as reverse, thus equalling the conventional mechanical three speed transmission in the number of ratios available.

It is a further object to provide a transmission wherein the step-up from one ratio to another will take place automatically in response to the speed and torque demand at the output shaft.

A still further object is to provide a transmission of this type in which the hydraulic portion thereof will function as a torque converter of the reaction type during acceleration of the vehicle, and as a coupling of the kinetic type during cruising of the vehicle; the change from the converter stage to the coupling stage taking place automatically in response to predetermined operating conditions.

A still further object is to provide a combined fluid and mechanical transmission in which the conversion ratios in the hydraulic and gear units are balanced in such manner that less torque conversion is required in the hydraulic unit than is the case in devices of the prior art thereby providing a relatively higher efficiency.

A still further object is the provision of a combined hydraulic and mechanical transmission wherein a plurality of driving ratios is obtained automatically, the change from one ratio to another taking place in the mechanical unit in response to a change in reaction on the guide wheel of the hydraulic unit.

Other objects and advantages of the invention will be apparent from the following description taken in conjunction with the accompanying drawings in which like reference numerals are used to designate corresponding parts referred to in the description.

In the drawing,

Fig. 1 is a longitudinal sectional view of the upper half of my improved power transmission.

Fig. 2 is a diagrammatic view of the hydraulic circuit during the converter stage.

Fig. 3 is a similar view of the hydraulic circuit during the coupling stage.

Fig. 4 is a sectional view along line 4—4 of Fig. 1.

Fig. 5 is a sectional view along line 5—5 of Fig. 1.

The transmission comprises a casing 10 at the forward end of which is disposed a flywheel 11 to which is attached an engine starting ring gear 12. The flywheel 11 is adapted to be carried on the rear end portion of an engine crankshaft (not shown) to be rotated therewith.

A pump or impeller wheel 13 having vanes 14 and a torus ring 15 is attached by bolts 16 to flywheel 11 for rotation therewith. The impeller has a rearwardly extending cylindrical portion 17 which cooperates with a suitable seal 18 to prevent escape of the working fluid from housing 10.

Arranged in opposed relation with respect to the impeller 13 is a runner or turbine wheel having vanes 20 and a torus ring 21. The runner 19 is bolted at 22 to a hub member 23, the latter being splined at 24 to a shaft 25. The shaft 25 is piloted at its forward end in an anti-friction bearing 26 carried by the flywheel 11.

Disposed between the impeller and runner and in series therewith is a reaction or guide wheel 27. The guide wheel is provided with a torus ring 28, a set of stationary vanes 29 and a set of movable vanes 30, the latter being pivoted at 31 for swinging under the influence of the fluid as will be more fully explained later on. The guide wheel is fastened at 32 to a sleeve 33 which is rotatably carried on the shaft 25.

The sleeve 33 is connected by a jaw clutch 34 with a second sleeve 35 which is also rotatably carried on shaft 25 and which extends rearwardly along the axis thereof. The sleeve 35 has teeth 36 formed integrally thereon which teeth form the sun gear of a planetary gearset, the annulus gear 37 of which is formed integrally on the rearward end of shaft 25.

The carrier 38 of the gearset is fastened at 39 to the annular extending portion 40 of the tail or output shaft 41, the latter being bearinged in the casing 42 by a pair of ball bearings 43 and 45, a roller bearing 44 supporting the rear end of the shaft 25 in the hollowed out portion 46 of the tail shaft as illustrated.

The teeth 36 are of helical form and are so related to the teeth 47 of planet pinion 48 which is carried by carrier 38 that an axial thrust is imposed on sleeve 35 during normal operation of the transmission. This thrust tends to move the sleeve 35 forwardly or to the left of Fig. 1 thereby thrusting collar 49 which is carried by the sleeve into engagement with rollers 50. Collar 49 is formed with cam surfaces, as illustrated in Fig. 4, which cooperate with rollers 50 when the sleeve 35 is thrust toward the left of Fig. 1 to lock the sleeve against reverse rotation relative to a brake drum 51. The latter is adapted to be engaged by a brake band 52 under the control of a brake control mechanism designated generally by numeral 53. As is apparent from Fig. 4, the brake drum 51, when locked against rotation, will prevent rotation of sleeve 34 in a reverse direction while permitting free rotation thereof in a forward direction.

As can be seen in Fig. 1, a clearance 54 is provided between the end of sleeve 35 and the annular disc portion of gear 37. This clearance permits sleeve 35 to move rearwardly, or to the right of the sheet, sufficiently to disengage cam 49 from rollers 50 thereby to render the rollers ineffective. The force necessary to counterbalance the forward thrust of helical teeth 47 is supplied by sleeve 33. It will be noted that the clutch portion 33' of the sleeve 33 is formed with inclined surfaces which cooperate with mating inclined surfaces formed on the clutch portion of the sleeve 35. The surfaces are so related that upon backward rotation of sleeve 33, rearward thrust is imposed on sleeve 35 which tends to move the latter to the limit of movement permitted by the clearance 54. The function of overrunning rollers 50 and the associated mechanism will be more fully explained below.

The rearwardly extending cylindrical extension 51' of brake drum 51 also cooperates with a second set of rollers, designated 55 on the drawing, forming part of a second overrunning device which is operable to prevent backward (counterclockwise) rotation of sun gear 56 with respect to brake drum 51. Sun gear 56 has a forwardly extending cylindrical portion 56' (Fig. 5) having cam surfaces formed thereon and so inclined with respect to rollers 55 that sun gear 56 is prevented from backward rotation (when brake band 52 is set) but is free for forward rotation.

Sun gear 56 forms part of a second planetary gearset, the planet pinion teeth 57 of this gearset being formed in the pinion 48, the pinion 48 and carrier 38 being common to both planetary sets. The teeth 57 mesh with the teeth of an annulus gear 58 which is formed as an integral rearward extension of a brake drum 59. A brake band 60 adapted for operation by mechanism 61 controls the rotation of drum 59.

The brake bands 60 and 52 may be manually actuated by a suitable control linkage disposed for easy actuation by the vehicle driver, or they may be power actuated by any suitable means.

The operation of the device will now be described.

To start the vehicle from rest, the brake band 52 is set thereby rendering the brake drum 51 non-rotatable. The impeller 13, which is rotated at all times during operation of the vehicle engine, delivers fluid into the vane passages of the runner 19 which fluid reacts against the vanes of the guide wheel 27. The reaction on guide wheel 27 imparts to the latter a tendency to rotate backwardly which results in a rearward thrust on sleeve 35 (the inclined clutch surfaces 33' having a camming action during backward rotational tendency of guide wheel 27). The cam element 49 is thus moved rearwardly sufficiently to prevent engagement of rollers 50 and the backward (counterclockwise) rotational tendency of guide wheel 27 is transmitted through teeth 36 to the teeth 47 of planet pinion 48. Planet pinion 48 is rotated forwardly (clockwise) by the forward rotation of annulus gear 37 which is of course rotating at the speed of the runner 19. The sun gear 56 will therefore be given a backward (counterclockwise) rotational tendency which will immediately be opposed and prevented by lock-up of the rollers 55 against the brake drum 51, thus the tail shaft 41 will be rotated forwardly with increased torque and at a reduced speed relative to the flywheel 11 as determined by the multiplication factors of the hydraulic unit and the gears 37 and 56, both of which are cumulative during this first stage of drive which corresponds to low gear in conventional transmissions.

During this stage of drive, the flexible portions 30 of the guide vanes 29 are inclined backwardly to accommodate the backward thrust of the fluid on the guide wheel. This condition is illustrated diagrammatically in Fig. 2.

As the car accelerates, the torque demand on shaft 41 decreases and there is a corresponding drop in reaction on the vanes of the guide wheel 27. When the reaction on wheel 27 reaches zero the helical teeth 47 of planet pinion 48 will thrust sleeve 35 forwardly or to the left. This action is not opposed by the clutch cams 33' because there is no reaction on sleeve 33, therefore the cam 49 is shifted forwardly and the rollers 50 lock the sleeve 35 against backward rotation relative to brake drum 51 which is still locked. Sleeves 35 and 33, teeth 36 and guide wheel 27, are thus locked against backward rotation and the vehicle is driven forwardly in the second stage of torque conversion, this stage being a lower torque multiplication with correspondingly higher speed at the tail shaft 41 due to the difference in size of the sun gear 36 relative to the sun gear 56. This stage of drive corresponds to second or intermediate speed ratio in the conventional transmission and the fluid flow in the hydraulic unit is the same as in first speed as represented diagrammatically in Fig. 2.

It should be noted that the change in ratio from first stage to second stage is accomplished automatically through a change in mechanical gear ratio, the conversion ratio in the hydraulic unit remaining constant.

Continued acceleration of the vehicle will be accompanied by a further decrease in torque demand on tail shaft 41 and a corresponding decrease in slip between impeller 13 and runner 19. The reaction on guide wheel 27 will eventually disappear and the latter will have a tendency to be carried forwardly by the fluid, which tendency is accommodated by release of the rollers 50 and a reversal of position of the pivotal vanes 30 which swing forwardly to the position shown in Fig. 3. The transmission is now operating in direct drive, the hydraulic unit functioning as a simple coupling of the kinetic type with the guide wheel acting as an auxiliary runner and rotating at approximately the speed of the impeller. The planetary unit under such conditions rotates as a unit with both sets of rollers 50 and 55 overrunning.

Abnormal torque demand on shaft 41 caused by acceleration or hill climbing will be automatically taken care of by a drop in transmission ratio to either second or first speed depending on the torque difference shafts 41 and 25.

Reverse driving of the vehicle is accomplished by setting of the brake band 60 (with the band 52 released). The reaction on guide wheel 27 causes it to rotate rearwardly and, as annulus gear 58 is locked, a couple is applied to planet pinion 48 which causes the latter to rotate backwardly around the teeth of annulus gear 58 and thus produce reverse rotation of carrier 38 and tail shaft 41.

Release of both brake bands will free the planetary gearing of any and all reaction points and a no-drag neutral will result.

It may thus be seen that I have provided a novel and highly efficient automatic transmission of simple construction. Although a specific embodiment of the device is illustrated and described, it is desired to point out that the invention is capable of embodiment in many different forms, and it is not intended to limit the invention in the broader aspects thereof except as set forth in the claims appended hereto.

I claim:

1. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and means for locking said sun gear against rotation thereby to provide reaction for said drive.

2. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and overrunning release means for locking said sun gear against rotation thereby to provide reaction for said drive.

3. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and means for locking said sun gear against rotation in the direction of rotational tendency thereof caused by thrust of the impelled fluid on said guide wheel.

4. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and releasable means for locking said sun gear against rotation thereby to provide reaction for said drive.

5. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and overrunning release means for locking said sun gear against reverse rotation while freely permitting forward rotation thereof whereby said guide wheel and sun gear are automatically releaseable for forward rotation in response to a decrease in torque demand on said output structure.

6. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner, a sun gear connected with said guide wheel and a pinion carried by said carrier and meshing with said annulus gear and sun gear respectively; and overrunning release means for locking said sun gear against reverse rotation while freely permitting forward rotation thereof whereby said guide wheel and sun gear are automatically releaseable for forward rotation in response to a decrease in torque demand on said output structure; and means for releasing said sun gear for free rotation in either direction thereby to provide a no-drag neutral.

7. In a power transmission having input and output structures, an impeller driven by said input structure; runner and guide wheel members disposed in fluid receiving relation relative to said impeller; means for providing a combined fluid and mechanical torque multiplying drive between said input and output structures comprising a planetary carrier connected to said output structure, an annulus gear connected with said runner; a sun gear connected with said guide wheel and a pinion carried by said carrier and meshing wtih said annulus gear and sun gear respectively; and means for locking said sun gear against rotation thereby to provide reaction for said drive, said means being releaseable to permit free rotation of said sun gear whereby a non-dragging neutral is provided.

8. In a power transmission having input and output structures, an impeller driven by said input structure; runner and guide wheel members disposed in fluid receiving relation relative to said impeller; means for providing a combined multi-stage fluid and mechanical torque multiplying drive between said input and output structures comprising a compound planetary gearset having a carrier connected to said output structure; a pinion carried by said carrier and provided with two sets of teeth of different pitch diameter; an annulus gear meshing with one of said sets of pinion teeth and connected to said runner; a pair of sun gears disposed in mesh with said respective sets of pinion teeth; means connecting one of said sun gears with said guide wheel; and means for selectively restraining rotation of said sun gears thereby to provide two ratios of torque multiplication.

9. In a power transmission having input and output structures, an impeller driven by said input structure; runner and guide wheel members disposed in fluid receiving relation relative to said impeller; means for providing a combined multi-stage fluid and mechanical torque multiplying drive between said input and output structures comprising a compound planetary gearset having a carrier connected to said output structure; a pinion carried by said carrier and provided with two sets of teeth of different pitch diameters; an annulus gear meshing with one of said sets of pinion teeth and connected to said runner; a pair of sun gears disposed in mesh with said respective sets of pinion teeth; means connecting one of said sun gears with said guide wheel; means for selectively locking said sun gears against reverse rotation comprising a pair of overrunning brake devices selectively operable in response to changes in the reaction force on said guide wheel.

10. In a power transmission having input and output structures, an impeller driven by said input structure; runner and guide wheel members disposed in fluid receiving relation relative to said impeller; means for providing a combined multi-stage fluid and mechanical torque multiplying drive between said input and output structures comprising a compound planetary gearset having a carrier connected to said output structure; a pinion carried by said carrier and provided with two sets of teeth of different pitch diameters; an annulus gear meshing with one of said sets of pinion teeth and connected to said runner; a pair of sun gears disposed in mesh with said respective sets of pinion teeth; means connecting one of said sun gears with said guide wheel; and means for selectively locking said sun gears against reverse rotation comprising a pair of overrunning brake devices selectively operable in response to changes in the reaction force on said guide wheel, and means for releasing both of said sun gears for free rotation thereby to provide a neutral non-driving condition in said transmission.

11. In a power transmission having input and output structures, an impeller driven by said input structure; runner and guide wheel members disposed in fluid receiving relation relative to said impeller; means for providing a combined multistage fluid and mechanical torque multiplying drive between said input and output structures comprising a compound planetary gearset having a carrier connected to said output structure; a pinion carried by said carrier and provided with two sets of teeth of different pitch diameters; an annulus gear meshing with one of said sets of pinion teeth and connected to said runner; a second annulus gear meshing with the other of said sets of teeth; a sun gear disposed in mesh with one of said sets of pinion teeth and connected with said guide wheel; means for locking said sun gear against rotation to provide forward drive through said transmission and means for locking said second annulus gear against rotation to provide reverse drive therethrough.

12. In a power transmission having input and output structures, an impeller driven by said input structure; runner and guide wheel members disposed in fluid receiving relation relative to said impeller; means for providing a combined multi-stage fluid and mechanical torque multiplying drive between said input and output structures comprising a compound planetary gearset having a carrier connected to said output structure; a pinion carried by said carrier and provided with two sets of teeth of different pitch diameters; an annulus gear meshing with one of said sets of pinion teeth and connected to said runner; a pair of sun gears disposed in mesh with said respective sets of pinion teeth; means connecting one of said sun gears with said guide wheel; and means for selectively restraining rotation of said sun gears thereby to provide two ratios of torque multiplication for forward driving; a second annulus gear disposed in mesh with the second of said sets of pinion teeth, and means for locking said second annulus gear against rotation thereby to provide reverse drive.

13. In a torque multiplying transmission, a compound planetary gearset including a pair of reaction gears adapted respectively to be held against rotation to provide a pair of operating ratios; means for controlling rotation of said gears including a pair of brake devices adapted for engagement therewith; and means for controlling operation of said brake devices comprising a thrust operated member operable in response to variations in reaction force on one of said gears.

14. In a torque multiplying transmission, a fluid torque converting device including a fluid reaction member; a mechanical torque converting device including a compound planetary gearset connected in series with said fluid device; said gearset including a pair of reaction gears respectively adapted to be held against rotation to provide a pair of operating ratios; means for controlling operation of said gears comprising a pair of brake devices; and means for controlling operation of said brake devices comprising a thrust operable member adapted for operation in response to variations in torque reaction on said fluid reaction member.

15. In a torque multiplying transmission, a fluid torque converting device including a fluid reaction member; a mechanical torque converting device including a compound planetary gearset connected in series with said fluid device; said gearset including a pair of reaction gears respectively adapted to be held against rotation to provide a pair of operating ratios; at least one of said gears being provided with helical teeth; means for controlling operation of said gears comprising a pair of brake devices, one of said brake devices having an element adapted for movement into operating position by the thrust of said helical teeth; and a thrust device connecting said fluid reaction member and said element and disposed so that the thrust thereof is opposite to that of said helical teeth thereby to control the movement of said brake element in response to the distribution of reaction force on said fluid reaction member and said gears.

16. The combination set forth in claim 15 wherein the thrust device comprises a dog clutch having a pair of clutch members rotatably connected by ramped dog members, the ramps thereof being so arranged that a thrust is exerted tending to separate said clutch members in one direction of rotation thereof.

17. In a power transmission having input and output structures, a fluid impeller wheel driven by the input structure; a planetary gear carrier drivingly connected with the output structure, a pinion carried by said carrier and having two sets of teeth of different pitch diameters, sun and annulus gears meshing respectively with one of said sets of teeth, a fluid turbine wheel connected to said annulus gear, a fluid reaction wheel connected with said sun gear, a second sun gear disposed in mesh with the other set of pinion teeth, overrunning brake devices respectively operatively associated with each of said sun gears and adapted for operation to prevent reverse rotation of said sun gears while permitting free forward rotation thereof, said brake devices being so constructed and arranged with respect to said sun gears that when one brake device is operated, the other is rendered inoperative.

18. In a power transmission having input and output structures, a fluid impeller wheel driven by the input structure; a planetary gear carrier drivingly connected with the output structure, a pinion carried by said carrier and having two sets of teeth of different pitch diameters, sun and annulus gears meshing respectively with one of said sets of teeth, a fluid turbine wheel connected to said annulus gear, a fluid reaction wheel connected with said sun gear, a second sun gear disposed in mesh with the other set of pinion teeth, overrunning brake devices respectively operatively associated with each of said sun gears and adapted for operation to prevent reverse rotation of said sun gears while permitting free forward rotation thereof, said brake devices being so constructed and arranged with respect to said sun gears that when one brake device is operated, the other is rendered inoperative, and means for effecting operation of said brake devices operable automatically in response to an increase or decrease in slip between said turbine wheel and said impeller wheel.

19. In a power transmission having input and output structures, a fluid impeller wheel driven by the input structure; a planetary gear carrier drivingly connected with the output structure, a pinion carried by said carrier and having two sets of teeth of different pitch diameters, sun and annulus gears meshing respectively with one of said sets of teeth, a fluid turbine wheel connected to said annulus gear, a fluid reaction wheel connected with said sun gear, a second sun gear disposed in mesh with the other set of pinion teeth, a brake drum, a selectively operable brake band for controlling rotation of said drum, an overrunning brake device operatively disposed between each of said sun gears and said drum, said overrunning brake devices being adapted for selective operation when said brake band is set to prevent reverse rotation of said sun gears while permitting free forward rotation thereof.

WILLIAM D. TIPTON.